United States Patent
Au et al.

(10) Patent No.: US 10,873,885 B2
(45) Date of Patent: Dec. 22, 2020

(54) USE-TRIGGERED SIGNAL SCANNING FOR NETWORK DETECTION

(71) Applicant: T-Mobile USA, Inc., Bellevue, WA (US)

(72) Inventors: Chad Au, Kirkland, WA (US); Kun Lu, Bellevue, WA (US); Ming Shan Kwok, Seattle, WA (US); Jun Liu, Issaquah, WA (US); Egil Gronstad, Encinitas, CA (US); Alan Denis MacDonald, Bellevue, WA (US); John J. Humbert, Roeland Park, KS (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/378,148

(22) Filed: Apr. 8, 2019

(65) Prior Publication Data

US 2020/0068638 A1   Feb. 27, 2020

Related U.S. Application Data (60) Provisional application No. 62/723,301, filed on Aug. 27, 2018, provisional application No. 62/752,194, filed on Oct. 29, 2018.

(51) Int. Cl.
*H04W 76/16* (2018.01)
*H04W 36/00* (2009.01)
(Continued)

(52) U.S. Cl.
CPC ...... *H04W 36/0069* (2018.08); *H04B 17/318* (2015.01); *H04L 5/0082* (2013.01);
(Continued)

(58) Field of Classification Search
CPC ......... H04W 36/0069; H04W 52/0245; H04W 24/02; H04W 24/08; H04W 48/16;
(Continued)

(56) References Cited

U.S. PATENT DOCUMENTS 8,565,747 B2   10/2013  Karaoguz et al.
8,843,181 B2*  9/2014   Seibert ................ H04B 1/7085
                                                455/574
(Continued)

FOREIGN PATENT DOCUMENTS

WO   WO2016116145 A1   7/2016
WO   WO2016188701 A1   12/2016
WO   WO2017196106 A1   11/2017

OTHER PUBLICATIONS

Office Action for U.S. Appl. No. 16/378,179, dated Jan. 24, 2020, Lu, "Variable Interval Signal Scanning in Dual Connectivity Communication Networks", 10 Pages.
(Continued)

*Primary Examiner* — Wutchung Chu
(74) *Attorney, Agent, or Firm* — Lee & Hayes, P.C.

(57) ABSTRACT

A wireless communication system may support two types of networks, such as a $4^{th}$-Generation (4G) network and a $5^{th}$-Generation (5G) network. The 4G network is accessed through Long-Term Evolution (LTE) base stations. The 5G network is accessed through New Radio (NR) base stations. During idle mode, a communication device may scan 5G RF frequencies to determine whether a 5G signal is available and whether to display a 5G network symbol in the status bar of the device. The communication device is configured to detect conditions indicating whether a user of the device is likely viewing the device and/or the display of the device. If it is unlikely that the user is viewing the device or its screen, RF frequency scanning is paused to reduce power consump-
(Continued)

tion and the currently displayed network symbol is maintained until RF frequency scanning is resumed.

20 Claims, 5 Drawing Sheets (51) Int. Cl.
  H04L 12/24      (2006.01)
  H04W 48/18     (2009.01)
  H04W 48/16     (2009.01)
  H04W 24/02     (2009.01)
  H04B 17/318    (2015.01)
  H04L 5/00       (2006.01)
  H04W 52/02     (2009.01)
  H04W 88/06     (2009.01)

(52) U.S. Cl.
  CPC ...... H04L 41/0668 (2013.01); H04L 41/0677 (2013.01); H04W 24/02 (2013.01); H04W 48/16 (2013.01); H04W 48/18 (2013.01); H04W 52/0245 (2013.01); H04W 76/16 (2018.02); H04W 88/06 (2013.01)

(58) Field of Classification Search
  CPC ..... H04W 48/18; H04W 76/16; H04W 8/005; H04W 48/12; H04W 88/06; H04L 41/0668; H04L 41/0677; H04L 41/22; H04L 43/0805; H04L 43/16; H04L 5/0082
  See application file for complete search history.

(56) References Cited

U.S. PATENT DOCUMENTS

| | | | |
|---|---|---|---|
| 9,031,606 B2 | 5/2015 | Daniel | |
| 9,277,345 B2 | 3/2016 | Lui et al. | |
| 9,615,304 B2 | 4/2017 | Breuer et al. | |
| 9,628,115 B1* | 4/2017 | Tsai | H01L 23/66 |
| 9,907,007 B1* | 2/2018 | Xue | H04W 36/30 |
| 10,027,573 B2 | 7/2018 | Shaw et al. | |
| 10,397,840 B2 | 8/2019 | Shaw et al. | |
| 2006/0062149 A1 | 3/2006 | Bednasz | |
| 2008/0014934 A1 | 1/2008 | Balasubramanian et al. | |
| 2009/0137247 A1 | 5/2009 | Mok | |
| 2012/0258715 A1* | 10/2012 | Souissi | H04W 36/32 455/436 |
| 2013/0110565 A1* | 5/2013 | Means, Jr. | G06Q 10/063 705/7.11 |
| 2013/0237220 A1 | 9/2013 | Lee et al. | |
| 2015/0045020 A1 | 2/2015 | Wang et al. | |
| 2015/0173004 A1* | 6/2015 | Nigam | H04W 56/001 370/331 |
| 2016/0227475 A1* | 8/2016 | Zhu | H04W 48/16 |
| 2016/0249268 A1* | 8/2016 | Usui | H04W 16/32 |
| 2018/0019857 A1* | 1/2018 | Kazmi | H04L 5/14 |
| 2018/0075798 A1* | 3/2018 | Nho | G09G 3/32 |
| 2018/0082633 A1* | 3/2018 | Tan | G09G 3/20 |
| 2018/0332659 A1* | 11/2018 | Hwang | H04W 88/06 |
| 2018/0368016 A1* | 12/2018 | Lee | H04W 76/15 |
| 2019/0069205 A1 | 2/2019 | Lee et al. | |
| 2019/0069229 A1 | 2/2019 | Lee et al. | |
| 2019/0379469 A1 | 12/2019 | Lu et al. | |
| 2020/0068456 A1 | 2/2020 | Humbert et al. | |
| 2020/0068482 A1 | 2/2020 | Lu et al. | |
| 2020/0084682 A1 | 3/2020 | Wang et al. | |
| 2020/0092774 A1* | 3/2020 | Sharma | H04W 36/00835 |
| 2020/0112845 A1* | 4/2020 | Zhao | H04W 76/11 |
| 2020/0344839 | 10/2020 | Kwok et al. | |

OTHER PUBLICATIONS

Office Action for U.S. Appl. No. 16/378,179, dated Apr. 2, 2020, Lu, "Variable Interval Signal Scanning in Dual Connectivity Communication Networks", 9 Pages.

Intel Corporation, "Dual Registration Solution for 5GS/EPS Interworking", R2-1802964, 3GPP TSG RAN WG2 Meeting #101, Athens, Greece, Feb. 16, 2018, pp. 1-3.

Office Action for U.S. Appl. No. 16/378,202, dated Nov. 22, 2019, Humbert, Displaying Network Availability in Dual Connectivity Networks, 10 pages.

PCT Search Report and Written Opinion dated Dec. 30, 2019 for PCT Application No. PCT/US2019/047553, 12 pages.

Office Action for U.S. Appl. No. 16/378,179, dated Aug. 15, 2019, Lu, "Variable Interval Signal Scanning in Dual Connectivity Communication Networks", 8 pages.

PCT Search Report and Written Opinion dated Oct. 1, 2019, for PCT Application No. PCT/US2019/034110, 11 pages.

Office Action for U.S. Appl. No. 16/120,605, dated May 26, 2020, Lu, "Network Symbol Display in Dual Connectivity Regions", 11 Pages.

Office Action for U.S. Appl. No. 16/442,040, dated Jul. 20, 2020, Kwok, "5G Wireless Network Connection Symbol Policy", 11 Pages.

Office Action for U.S. Appl. No. 16/378,179, dated Jun. 25, 2020, Lu, "Variable Interval Signal Scanning in Dual Connectivity Communication Networks", 10 pages.

Office Action for U.S. Appl. No. 16/120,605, dated Oct. 8, 2020, Lu, "Network Symbol Display in Dual Connectivity Regions", 13 Pages.

Extended European Search Report dated Sep. 23, 2020 for European Patent Application No. 20168539.3, 10 pages.

"LS Reply to 3GPP SA2 on Status Icon related to 5G", retrieved on Jan. 21, 2018 at «http://www.3gpp.org/ftp/Meetings%5F3GPP%5FSYNC/SA2/Docs/», retrieved on 2018—vol. SA WG2, No. Gothenburg, Sweden: Jan. 22, 2018-Jan. 26, 2018, 3GPP Draft, 3rd Generation Partnership Prokect (3GPP), Jan. 21, 2018, pp. 1-4.

Office Action for U.S. Appl. No. 16/442,040, dated Nov. 10, 2020, Kwok, "5G Wireless Network Connection Symbol Policy", 14 Pages.

* cited by examiner

USE-TRIGGERED SIGNAL SCANNING FOR NETWORK DETECTION

CROSS-REFERENCE TO RELATED APPLICATION

This application claims priority to the following commonly owned U.S. Provisional Patent Application No. 62/723,301, filed Aug. 27, 2018, and titled "SMART UE-STATE TRIGGERED NETWORK SCANNING UNDER 5G EN DC IDLE MODE;" and to U.S. Provisional Patent Application No. 62/752,194, filed Oct. 29, 2018, and titled "5G COVERAGE INDICATOR," which are incorporated herein by reference in their entireties.

BACKGROUND

Cellular communication devices use various network radio access technologies to communicate wirelessly with geographically distributed base stations. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the 3rd-Generation Partnership Project (3GPP) for use within cellular communication networks by wireless communication carriers. Note that the terms 4G and LTE are often used interchangeably when referencing certain 4G systems and components. Also, NR radio access technology may at times be referred to as 5G radio access technology.

A configuration defined by the 3GPP in the 5G NR specification, referred to as Non-Standalone Architecture (NSA), allows the simultaneous use of 4G and 5G systems for communications with a communication device. Specifically, NSA uses dual connectivity (DC), in which a communication device uses both an LTE radio and an NR radio for downlink receptions from and uplink transmissions to corresponding LTE and NR base stations. An LTE carrier is used for control-plane signaling and for user-plane communications. An NR carrier is used for additional user-plane bandwidth, for data download or transmission throughput, and for uplink feedback related to channel conditions. In a scenario such as this, the LTE carrier is said to "anchor" the communication session.

Existing 4G networks use relatively low radio frequencies, such as frequencies in bands below 6 GHz. 5G networks are able to use an extended range of frequency bands compared to 4G networks, such as higher frequency bands in in the range of 6-100 GHz. Radio communications using the higher frequency 5G bands can support higher data speeds, but also have disadvantages compared to the lower frequency bands. Specifically, radio signals in the higher frequencies have shorter range and are more easily blocked by physical objects. Accordingly, the ability for a communication device to communicate using higher-frequency 5G bands may be sporadic as the device is physically moved.

Communication devices such as smartphones often have a status bar that shows, among other things, the current signal strength and/or signal quality of the current wireless connection with a base station. In addition, the status bar may have a network indicator, such as an icon or symbol, that indicates the network type being used for the current wireless connection. For example, the network indicator might comprise a "4G LTE" symbol when the current connection is over an LTE network, and a "5G" network symbol when the current connection is over a 5G network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for determining which of multiple network identifiers to display on the status bar of a wireless communication device when the device is operating in a cellular network of a wireless communication provider that has areas of dual signal coverage. Network identifiers might include, for example, symbols that indicate 3G, 4G, LTE, 5G, and so forth, corresponding to different wireless network standards and technologies.

The described techniques may be useful when a wireless communication device is within an area that is supported by both 4G and 5G technologies, for example. In this situation, 5G radio access technology may be used in a configuration referred to as Non-Standalone Architecture (NSA) dual connectivity. NSA dual connectivity uses 5G radio access technology to augment 4G communication capabilities. More specifically, NSA dual connectivity uses a Long-Term Evolution (LTE) anchor carrier, which is supplemented at times by a 5G New Radio (NR) carrier.

An initial connection between a communication device and a Long-Term Evolution (LTE) base station is configured based on LTE system information. System information in the LTE environment is broadcast by the LTE base station in data objects referred to as System Information Blocks (SIBs). System information may include information relating to cell access, scheduling, communication channels and frequencies, network identifiers, tracking area codes (TACs), cell IDs, status, power levels, paging information, neighboring cells, etc.

Cellular communication devices receive the LTE system information prior to establishing connections with LTE base stations, as well as during the connections. When there are changes in the system information of an LTE base station, connected cellular communication devices are notified and the devices retrieve the changes from subsequently broadcast SIBs.

In accordance with certain embodiments described herein, an LTE base station is configured to broadcast system information indicating that the LTE base station supports 5G NSA dual connectivity. In certain embodiments, this information may be included in an LTE SIB, as a parameter that is referred to herein as a 5G availability indicator or as an NSA availability indicator.

A wireless communication device, often referred to in this environment as a User Equipment (UE) or Mobile Station (MS), monitors the broadcast channels of one or more nearby LTE base stations in order to determine whether the LTE base stations support NSA dual connectivity. In some situations, the device may receive a broadcast 5G availability indicator indicating that an LTE base station supports NSA dual connectivity, but the device may nevertheless be in a location where NR signals are too weak to be used. This may be particularly problematic when the device is in idle mode, because when in idle mode the device does not maintain an active NR communication channel Under NSA, NR communication channels are instead set up when the device is in a connected mode. Because of this, before displaying a 5G network symbol the device takes further steps to confirm that 5G services are indeed available.

Specifically, when a device receives an indication that an LTE base station supports NSA dual connectivity, the device scans one or more NR frequencies to search for a broadcast NR reference signal, measures the signal strength and/or quality of any NR reference signal that it finds, and compares the measured NR signal strength and/or quality to a threshold signal strength and/or quality. The threshold signal strength and quality are equal to the approximate minimum signal strength and quality that would be needed to support NR data communications. If the measured signal strength and/or quality is greater than the threshold signal strength and/or quality, the device displays a 5G network symbol to inform the device user that the device is currently able to use 5G services. Otherwise, the device displays the 4G or LTE network symbol. In some embodiments, the threshold signal strength and/or quality may be configurable, and may be configured with different values for different frequency bands.

In some implementations, the device may be configured to receive NR configuration information during initial attachment to the LTE base station. Specifically, the LTE base station may use Radio Resource Control (RRC) signaling with the device to specify the frequencies that are potentially used for NR broadcast transmissions by the NR base station associated with the LTE base station. Based on this information, the device can limit the searching of NR frequencies to those frequencies that are actually being used, and can avoid searching other frequencies that are not used by the communication provider in the area where the device is located.

In other implementations, the device may be preconfigured with stored information indicating the possible frequencies of NR transmissions by either the communication provider or by NR base stations in specific locations.

In some embodiments, the signal scanning described above may be limited to certain times in order to reduce power consumption that may be involved in the signal scanning. In some embodiments, for example, the device may be configured to determine the probability that a user of the device is actually looking at the display of the device, and to pause signal scanning when the user is unlikely looking at the display. Whether the user is likely looking at the display may be determined based on factors such as whether the display is on, whether a lock screen or screen saver is active, whether the device is locked, whether the device's camera is obscured, whether a human face can be detected with the camera, whether the device is facing downward, whether the device is moving, and so forth.

In some embodiments, power consumption may be reduced by scanning periodically, rather than continuously, at intervals that increase in length over time. For example, the interval length may start at 1 second, increase to 2 seconds, increase to 4 seconds, and so on until reaching a maximum interval length. If or when an NR signal is found, the device displays the 5G network symbol, resets the interval length to its lowest or beginning value, and begins the process again, first at an interval length of 1 second, increasing to 2 seconds, and so forth until a suitable RF signal is no longer present or until reaching the maximum interval length. The use of varying intervals such as this allows quick updates in conditions where 5G coverage is changing frequently, while conserving power in conditions where coverage is relatively unchanging.

In some embodiments, scanning intervals may decrease in length over time. For example, the interval length may start at a maximum interval length, decrease to a lower length such as 4 seconds, decrease to 2 seconds, and so on until reaching a minimum interval length. In some embodiments, scanning intervals may be increased or decreased as a function of whether the device is moving. When the device is not moving or moving relatively slowly, scanning intervals may be increased in length over time, because signal conditions are less likely to be changing while the device is not moving. When the device is moving, as another example, scanning intervals may be decreased, because signal conditions are more likely to change as the device moves.

Other techniques may be used when determining which of multiple network identifiers to display. While in connected mode, for example, the device may be configured to detect NR communication link failures and in response to prevent the 5G symbol from being displayed for a set time period. As another example, when the device goes from connected mode to idle mode, the device may determine whether to display the 5G symbol based on whether an NR communication link was present at the time the device went to idle mode. If an NR communication link was present, the device may display the 5G symbol for a set time period. If an NR communication link was not present, the device may prevent the 5G symbol from being displayed for a set time period. In some embodiments, signal scanning may be paused during the mentioned time periods, thereby reducing the amount of power that would otherwise be consumed by signal scanning. In other cases, signal scanning may be continued, but the NR link failure detection described above may override signal detection during the indicated time periods.

Although certain techniques are described in the context of 4G and 5G networks, the techniques described herein may also be used with different network types, standards, and technologies. That is, the techniques may be used more generally for first and second wireless communication networks, where a 4G network is an example of the first wireless communication network and a 5G network is an example of the second wireless communication network.

Furthermore, although the techniques are described in the context of a single LTE base station and a single associated NR base station, the techniques may also be used in conjunction with cell groups, where a communication device might use carrier aggregation to concurrently communicate with more than one LTE base station and/or more than one NR base station.

The described techniques allow a cellular communication device to efficiently determine which of multiple network identifiers should be displayed to device users, while also reducing the amount of signal scanning and the amount of power consumed by signal scanning. While conserving power, the described techniques also provide reliable indications of network coverage, at intervals that are frequent enough to satisfy user needs and to provide good customer experiences.

Figure 1:
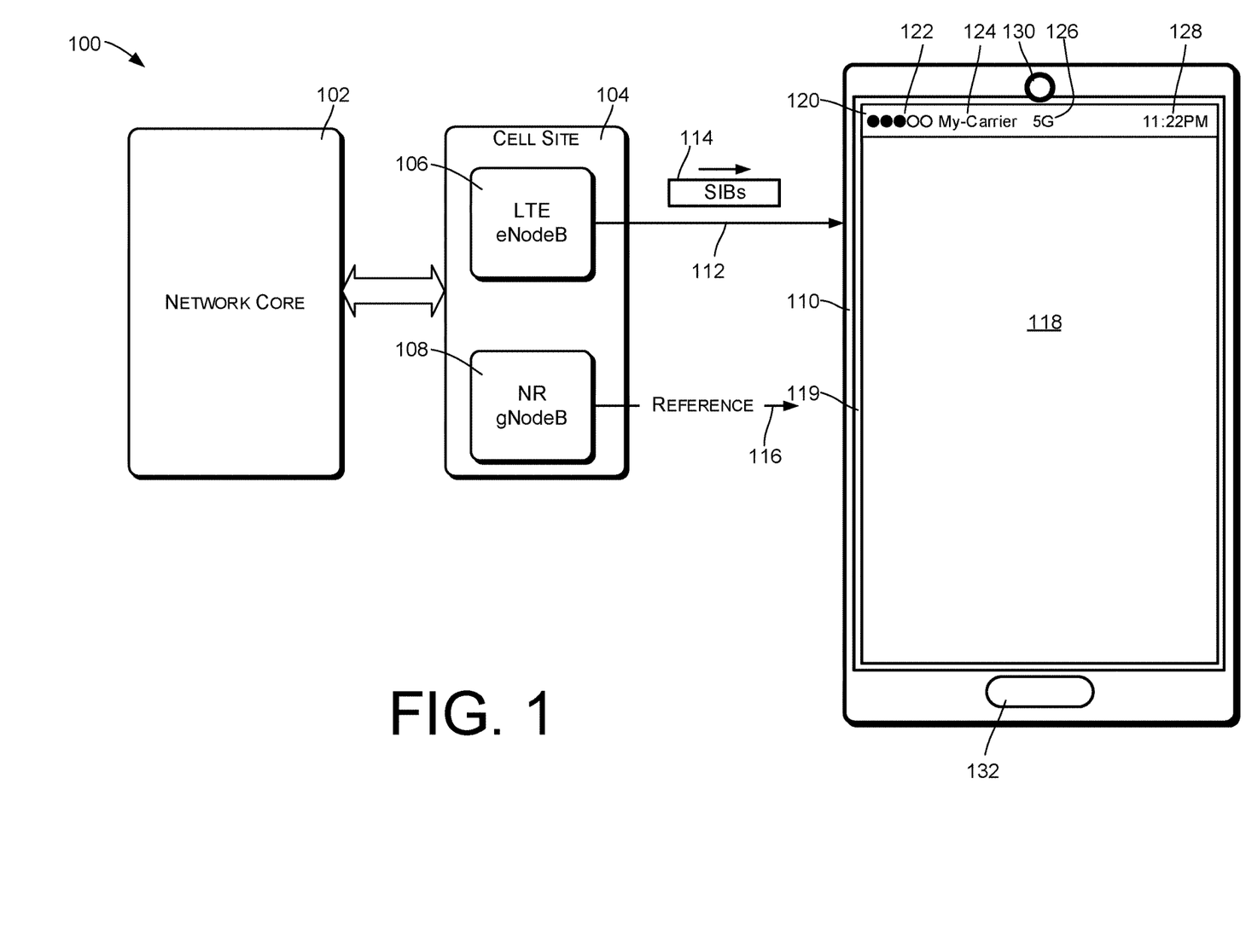
FIG. 1 is a block diagram showing relevant components of a communication network that supports Non-Standalone Architecture (NSA) dual connectivity based on $4^{th}$-Generation (4G) and $5^{th}$-Generation (5G) radio access technologies.

FIG. 1 illustrates relevant high-level components of a cellular communication system 100, such as components that might be implemented by a cellular communication provider. The communication system 100 has one or more network cores 102, which may in some cases include a 4G network core and a 5G network core. The communication system 100 has multiple cell sites 104, only one of which is shown in FIG. 1, for purposes of discussion.

The illustrated cell site 104 supports both 4G and 5G radio access technologies, and therefore has both 4G and 5G cellular access points. The 4G access point is implemented as an LTE base station 106, also referred to as an eNodeB, a master eNodeB, or a master base station. The 5G access point is implemented as a New Radio (NR) base station 108, also referred to as a gNodeB, a secondary gNodeB, or a secondary base station. The network core(s) 102 communicate with the LTE base station 106 and the NR base station 108. Radio communications are controlled by the LTE master base station 106. Note that various cell sites of the system 100 may be configured in different ways and may use different radio access technologies or combinations of radio access technologies.

A cellular communication device 110 is an example of many such devices that are configured for use with the communication system 100. In the described embodiment, the communication device 110 supports both 4G/LTE and 5G/NR networks and communications. Accordingly, the communication device 110 has an LTE radio (not shown) that communicates wirelessly with the LTE base station 106 of the cell site 104 and an NR radio (not shown) that communicates wirelessly with the NR base station 108 of the cell site 104. Although the 4G and 5G access points are shown as being collocated, in other embodiments the 4G and 5G access points may be at respectively different locations.

The communication device 110 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc.

The communication device 110 may communicate through either or both of the LTE base station 106 and the NR base station 108. In some cases or embodiments, the communication device 110 may support dual connectivity communications, in which a single communication session might simultaneously use both a 4G connection and a 5G connection. More specifically, the communication device 110 may operate using what is referred to as a Non-Standalone Architecture (NSA) dual connectivity, using 5G radio access technology to augment 4G communication capabilities. When using NSA dual connectivity, the communication device 110 uses both an LTE carrier and an NR carrier for downlink data reception and uplink transmissions.

When the communication device 110 is in idle mode, it receives one or more signals 112 that have been broadcast by the LTE base station 106. The one or more signals 112 may be broadcast for reception by multiple communication devices, and may contain information regarding capabilities and characteristics of the LTE base station 106. For example, a broadcast signal may include information needed by a communication device to establish bi-directional communications with the LTE base station 106. In the LTE environment, at least some of this information is provided in a periodically broadcast Master Information block (MIB) and multiple System Information Blocks (SIBs). FIG. 1 shows a single SIB 114 that is being broadcast by the LTE base station 106. The SIB 114 can be received by multiple communication devices, including the illustrated communication device 110.

Although the communication device 110 does not maintain a connection with the NR base station 108 when the device 110 is operating in idle mode, the NR base station 108 transmits one or more reference signals 116 that can be detected by the communication device 110 to determine whether the communication device 110 is within an area in which NR communications are possible. Specifically, the communication device is configured to measure reference signal received power (RSRP) and/or reference signal received quality (RSRQ) of any detected NR reference signals 116 to determine whether NR communications are possible.

The communication device 110 has a graphical user interface (GUI) 118 for presenting information and for interacting with a user. The GUI 118 may be displayed on a graphical display panel 119. For example, the graphical display panel may comprise a touch-sensitive flat panel display. As further examples, the graphical display panel 119 may comprise a TFT-LCD (thin film transistor technology, liquid crystal diode) display, an IPS (in-place switching) LCD, a capacitive touchscreen LCD, an OLED (organic light emitting diode) display, an AMOLDED (active-matrix organic light-emitting) diode, or any other display device.

The GUI 118 may be displayed at certain times and not at other times. At times, for example, the display may be off. Alternatively, or a screen saver or lock screen having relatively static and/or non-interactive information such as the time of day or other status information may be displayed in place of the GUI 118.

A status bar 120 is typically shown at the top of the GUI 118. In this example, the status bar 120 has a signal strength meter 122, a carrier identifier 124, and a network identifier 126. The status bar 120 also indicates the current time of day in a time field 128.

The signal strength meter 122 shows the strength and/or quality of signals or communication channels that have been established with the LTE base station 106 and/or the NR base station 108. The carrier identifier 124 corresponds to the network carrier or provider whose signals are being used for communications.

The network identifier 126 indicates the type of network that is being used by the communication device 110. More specifically, the displayed network identifier 126 corresponds to and identifies the wireless communication standard that is currently being used for communications by the communication device. In the example described herein, the network identifier 126 indicates "5G" when the device is in an area where 5G services can be accessed and displays "LTE" when the device is using LTE radio access technology and 5G services are not accessible. Other embodiments may of course have different types of networks, corresponding to different communication protocols, and may use symbols corresponding to those communication protocols.

It is generally intended for the status bar 120 to show a network identifier 126 corresponding to the most advanced or highest-capability cellular network that is currently available for use by the communication device 110. In the system described herein, a 5G network symbol is displayed when the communication device 110 is able to use 5G communications.

In certain implementations, a network availability indicator is included in one of the SIBs 114 that is broadcast periodically by the LTE base station 106. The network availability indicator indicates whether the LTE base station 106 is in a geographic area within which 5G services are available. More specifically, the LTE base station includes the network availability indicator when the LTE base station is associated with an NR base station and is configured to support NSA dual connectivity in conjunction with the NR base station.

In some embodiments, the network availability indicator may comprise a variable specified in the SIB, where the variable has a positive value when 5G services are available, and a negative value when 5G services are not available. In some embodiments, for example, an "upperLayerIndication" variable, generally described in 3GPP TS 36.331 as indicating support for an "upper layer," may be used to indicate that NSA services are available.

In some embodiments, the device 110 may have a user-facing camera 130 and/or a camera that faces outward from the user of the device. The device 110 may also have a microphone 132. The device 110 may have various other types of sensors, not shown in FIG. 1, such as an accelerometer, a compass, a global positioning device (GPS), a light sensor, a moisture sensor, a microphone, and so forth.

FIGS. 2-5 illustrate example methods that may be performed by a cellular communication device, such as a cellular telephone or smartphone, to determine which of multiple network symbols should be displayed in the status bar of the communication device. The example methods may be performed in an environment in which a first wireless communication network, such as a 4G network, serves multiple geographic areas, while a second wireless communication network, such as a 5G network, serves only some of the multiple geographic areas. The cellular communication device communicates through a first, master base station of a network cell to access the 4G cellular communication network. The communication device communicates through a second, secondary base station, to access the 5G cellular communication network.

The master base station, also referred to as a primary base station, is implemented in accordance with a first radio access technology, such as LTE, and is referred to below as an LTE base station. The secondary base station is implemented in accordance with a second radio access technology, such as 5G NR, and is referred to below as an NR base station. For purposes of this discussion, it will be assumed that the LTE base station acts as a master or primary base station for purposes of dual connectivity, and that the NR base station acts as a secondary base station.

Figure 2:
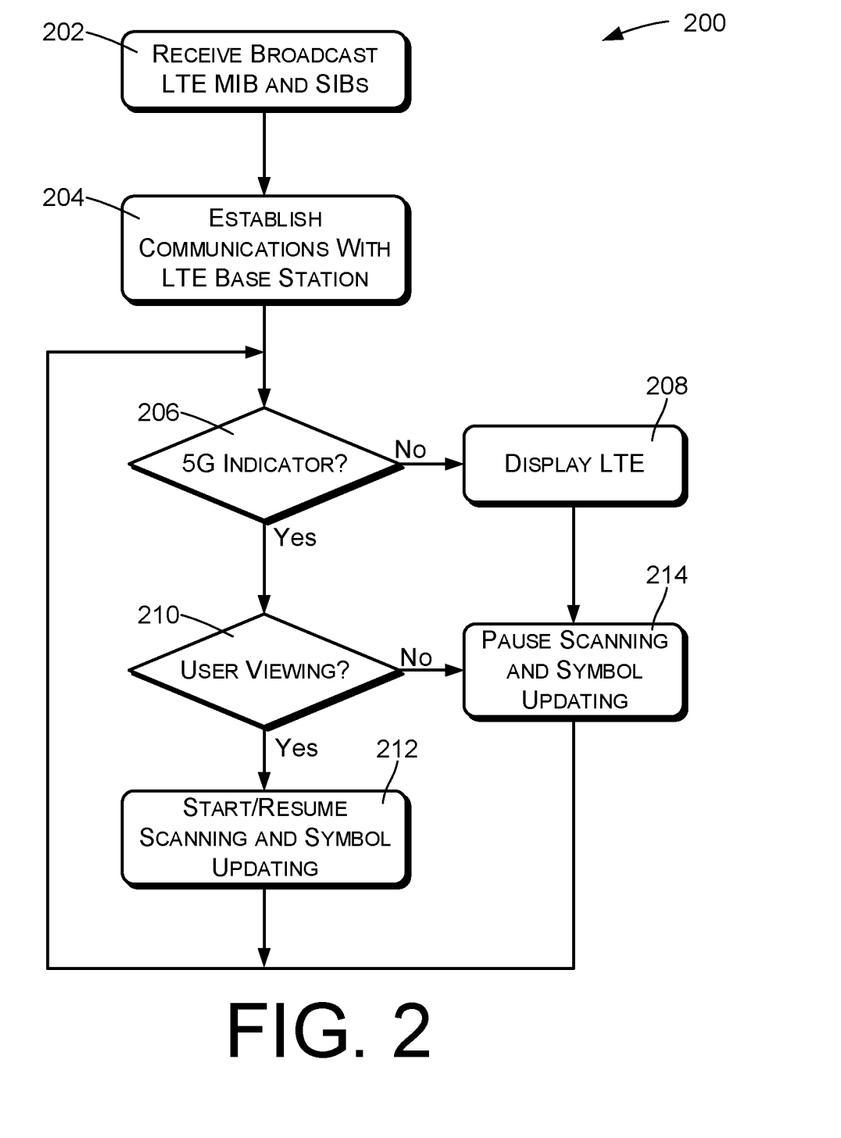
FIG. 2 is a flow diagram illustrating an example method that may be performed by a cellular communication device for pausing signal scanning during times when it is unlikely that a user is viewing the device.

FIG. 2 shows an example method 200 that may be implemented by the cellular communication device so that idle mode 5G signal scanning is performed primarily during times when a user is likely viewing the communication device.

An action 202 comprises receiving information over a broadcast channel of the LTE base station, where the information includes an indicator of whether the LTE base station is associated with an NR base station to support dual connectivity. In certain embodiments, for example, the information might comprise an LTE Master Information Block (MIB) and one or more LTE System Information Blocks (SIBs). The MIB and SIBs contain information that is used by the communication device to attach to the LTE base station. Most relevant to this discussion, an SIB may include a 5G availability indicator, indicating that the LTE base station supports Non-Standalone Architecture (NSA) dual connectivity in conjunction with an associated NR base station. In some cases, the "upperLayerIndication" variable of SIB2 may be used for this purpose.

The 5G availability indicator, when set to "TRUE" or "ON", indicates that 5G services are generally available in the geographic area within which the communication device is located. In many cases, this indication may indicate that the LTE base station is associated with an NR base station and configured to support NSA dual connectivity in conjunction with the NR base station. The cellular communication device may take further actions, as described below, to determine whether NR communications are actually possible at any given time.

The action 202 might be performed, for example, when the communication device is turned on and scans LTE frequency bands to find a suitable LTE signal, or when the communication device is handed off to a new cell, prior to establishing bi-directional communications with the LTE base station.

An action 204 comprises establishing bi-directional communications with the LTE base station. For example, the action 204 may comprise camping on the LTE base station, based on information received in the MIB and SIBs received in the action 202. As the communication device is moved about, it may camp on different LTE base stations of other network cells, after obtaining MIBs and SIBs from those LTE base stations.

An action 206 comprises determining whether broadcast information from the LTE base station indicates that 5G services are available to the communication device and/or that 5G services are generally available in the geographic area within which the communication device is located.

In some embodiments, the action 206 may comprise evaluating the 5G availability indicator to determine whether the LTE base station is associated with an NR base station to support NSA dual connectivity. More specifically, the action 206 may comprise determining whether the 5G availability indicator is set to a positive, "TRUE", or "ON" value. If the 5G availability indicator is not set to a positive, "TRUE", or "ON" value, an action 208 is performed of displaying an LTE network symbol, or another symbol that does not indicate 5G availability.

An action 210 is performed in response to receiving an indication from the LTE base station, such as the 5G availability indicator, indicating that the LTE base station is associated with an NR base station to support NSA dual connectivity. The action 210 comprises determining whether it is likely that the communication device and/or the display of the communication device is being viewed by a user. In some embodiments, this may be performed by detecting one or more device conditions indicating either that the display of the device is likely being viewed or that the display and/or its GUI is not likely being viewed.

In certain embodiments, the action 210 may comprise determining whether the display of the device is off, whether the device is displaying a screen saver, or whether the device has been locked for security, with any of these conditions indicating that the user is not likely looking at the device display.

The action 210 may similarly comprise determining whether the device is displaying its GUI. If the display is not displaying its GUI, and is instead primarily displaying relatively static and/or non-interactive content such as status information, time/date, etc., it is considered unlikely that the user is viewing the display.

As another example, the action 210 may comprise determining whether the device is in a low-power mode or sleep mode, which corresponds to a likelihood that the user is not actively using or viewing the device.

As another example, the action 210 may comprise determining the orientation of the device, and, in particular, determining whether the display of the device is facing downward. If the display is facing downward, it is considered unlikely that the user is viewing the display.

As another example, the action 210 may comprise determining that the device is in a pocket, purse, or other confined space from which would be difficult to use. More specifically, the action 210 may comprise determining whether a camera of the device is obscured, such as when the camera senses darkness. The action 210 may similarly comprise using a proximity sensor to determine that the display of the device is against a surface. As another option, acoustic measurements might be made using a microphone of the device, to determine whether ambient sounds have been blocked, which might indicate that the device is in a confined space such as a pocket. Any of these conditions may be considered indications that the user is not likely viewing the device or its display.

The action 210 may comprise detecting a human face using the user-facing camera of the device. If a human face is detected, it is likely that the user is viewing the device display.

The action 210 may comprise determining whether the device is moving or stationary, where non-movement, especially for some length of time, may indicate that the device is not being used.

Any of these conditions may be used alone or in combination to predict whether the probability of a user viewing the device, the device display, and/or the device GUI is greater or less than a probability threshold. In some implementations, for example, multiple conditions may weighted and summed, and a weighted sum that exceeds a given threshold may indicate that the device is likely being viewed. Similarly, multiple conditions may be evaluated algorithmically to determine whether the device is likely being viewed.

If in the action 206 it is determined that the communication device is in an area that is generally supported by 5G services, and in the action 210 a condition is detected indicating that communication device is likely being viewed by a user, an action 212 is performed. In the illustrated embodiment, the action 212 comprises initiating or resuming a procedure of scanning 5G RF frequencies and updating a displayed network symbol depending on whether a 5G RF signal can be found that satisfies applicable signal criteria and that can be used for 5G communications. Scanning, which will be described below with reference to FIGS. 3 and 4, may comprise repeatedly searching multiple frequencies used by the NR base station to detect an RF signal used by the NR base station for communications with cellular communication devices. During scanning, the searching may be repeated continuously, at a constant rate of repetition, or at fixed or varying time intervals.

Figure 3:
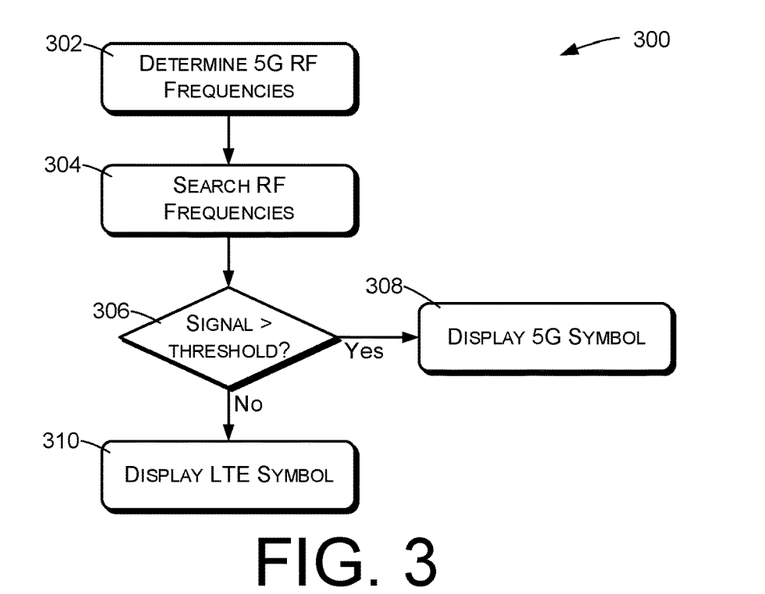
FIG. 3 is a flow diagram illustrating an example method for radio frequency (RF) signal scanning.
Figure 4:
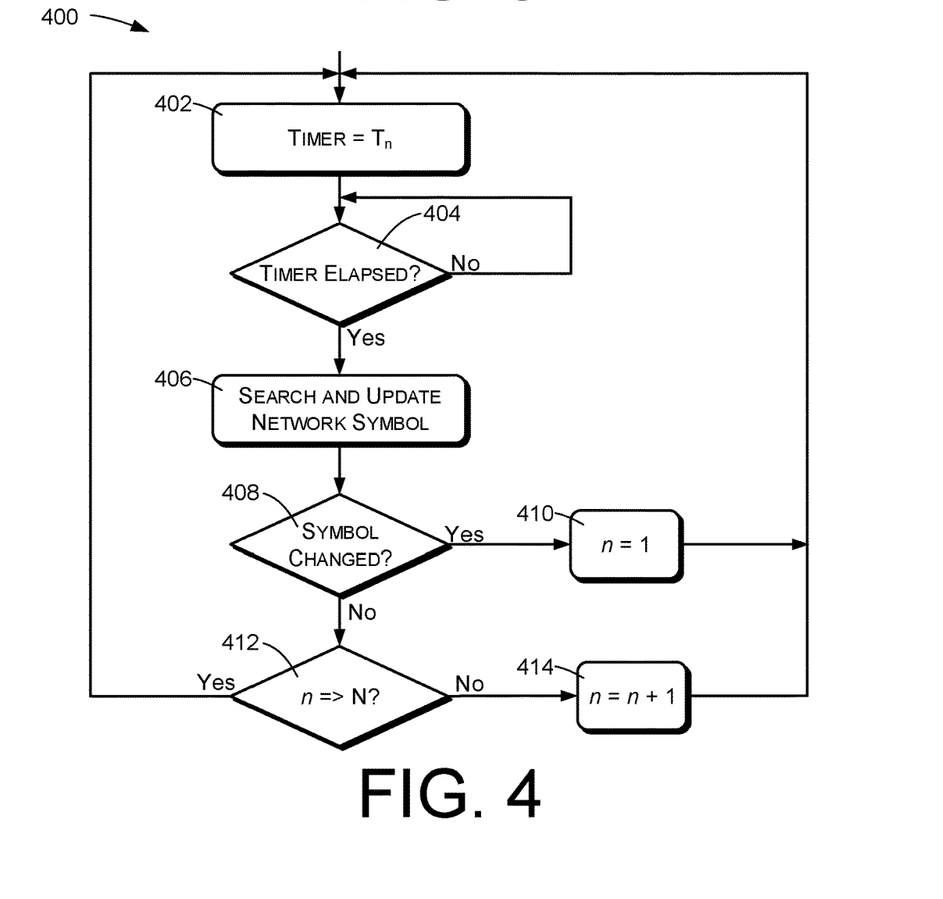
FIG. 4 is a flow diagram illustrating an example method for performing periodic signal scanning.

As will be further described in the discussion relating to FIGS. 3 and 4, the scanning and updating indicated by the action 212 also includes displaying a 5G network symbol in response to detecting a suitable 5G RF signal. If a suitable 5G RF signal is not found, the scanning and updating action 212 may display a symbol other than the 5G network symbol, such as the LTE network symbol.

If in the action 206 it is determined that the device is not in an area that is generally supported by 5G services, or if in the action 210 a condition is detected indicating that the user is not likely viewing the device, an action 214 is performed. The action 214 comprises pausing the described scanning of 5G frequencies and the described updating of the network identifier to conserve power. While scanning and updating are paused, the network identifier remains unchanged.

After either of the actions 212 or 214, the latter parts of the method 200 are repeated, starting at the action 206, to periodically determine whether to pause or resume 5G signal scanning and network symbol updating. For example, these actions may be repeated every several seconds, or in response to other conditions or events. When the cellular communication device moves to new cells and corresponding LTE base stations, the actions are repeated starting at the action 202.

FIG. 3 illustrates an example method 300 that may be implemented by the cellular communication device for scanning 5G RF frequencies to detect 5G RF signals and in response to display appropriate network symbols. The method 300 may be initiated, paused, or resumed in accordance with the actions 212 and 214 of FIG. 2. For example, the method 300 may be performed at any time in response to receiving a 5G availability indicator indicating that 5G services are potentially available. The method 300 may be performed continuously or periodically, when not paused.

An action 302 comprises determining the RF frequencies used by an NR base station for communicating with cellular devices. In particular, the action 302 may comprise receiving, from an LTE base station that is acting as a master base station, an identification of one or more frequencies used by an associated secondary NR base station. For example, the action may comprise receiving RRC messages from the LTE base station, where the RRC messages indicate the one or more frequencies that are used by the associated NR base station or base stations. More specifically, this information can be obtained from the "MeasObjectNR" information element as specified in 3GPP TS 36.331, Version 15.2.2, Paragraph 6.3.5.

An action 304 comprises searching for one or more RF signals on the RF frequencies identified in the action 302. For example, the action 304 may comprise tuning a receiver to the identified RF frequencies to detect RF reference signals, and measuring the signal strengths and/or qualities of one or more of the detected RF reference signals. For example, the action 304 may comprise determining a Reference Signal Received Power (RSRP) or Reference Signal Received Quality (RSRQ) of the NR base station.

An action 306 comprises determining whether any of the RF signals satisfy one or more signal criteria. For example, the action 306 may comprise determining whether an RF signal on one of the identified frequencies has a strength (i.e., RSRP) and/or signal quality (i.e., RSRQ) that is greater than a signal strength threshold or a signal quality threshold. In some embodiments, the signal thresholds may be configurable, and may be configured with different values for different frequency bands. This allows network operators to set different thresholds to account for channel fading profiles of different frequencies.

In response to detecting an RF signal that satisfies the one or more signal criteria, an action 308 is performed of displaying a 5G network symbol on the cellular communication device, indicating that 5G/NR radio access technology is currently available to the cellular communication device. The 5G network symbol can be any symbol that is known to be associated with 5G communications or that otherwise identifies the 5G network. For example, the symbol may comprise the text "5G".

If none of the RF signals satisfy the one or more signal criteria, an action 310 is performed, comprising displaying the LTE network symbol in the status bar or other display area of the communication device. The LTE network symbol can be any symbol that is known to be associated with LTE communications or that otherwise identifies the LTE network, such as the text "LTE". Alternatively, a symbol corresponding to any other type of available network, such as a 3G network, may be displayed.

The method 300 is repeated during any time that scanning is enabled (i.e., not paused) by the method 200. The method 300 may be repeated continuously, periodically, or in response to other conditions.

FIG. 4 shows an example method 400 that may be implemented by the cellular communication device so that idle mode 5G signal searching is performed at intervals of variable length in order to reduce power consumption. In one embodiment, the method 400 may be used in conjunction with the method 200 of FIG. 2. Specifically, the scanning referred to by the actions 212 and 214 of FIG. 2 may comprise repeatedly performing the method 400. When scanning is started or resumed in the action 212, the method 400 is performed repeatedly until paused in the action 214.

In other embodiments, the method 400 may be performed whenever the current LTE base station supports NSA dual connectivity, such as whenever the communication device has received a 5G availability indicator indicating that 5G NSA dual connectivity is supported by the LTE base station.

In the method 400, searching is repeated at time intervals, where the time intervals have a length that increases over time, after each repetition of searching, until the length reaches an upper limit. The length is reset to an initial, beginning value whenever the network symbol changes, such as from LTE to 5G or from 5G to LTE.

The method 400 uses a software-based timer that marks the time intervals. The timer measures a sequence of increasing time intervals $T_n$, where n ranges from 1 to N. In some embodiments, the sequence of time intervals may be increased over time in a predefined sequence of exponentially increasing values. For example, an exponentially increasing sequence may be where $T_1=1$ second, $T_2=2$ seconds, $T_3=4$ seconds, $T_4=16$ seconds and $T_5=32$ seconds, where N=5 and 32 seconds is the upper interval limit.

An action 402 comprises setting the timer to $T_n$. If this is the first time the method 400 is being performed, n=1, and $T_n=T_1$. Otherwise, the value of n is determined by subsequent actions of the method 400.

An action 404 comprises determining whether the timer has elapsed, indicating that a time $T_n$ has elapsed since the timer was set in the action 402. If the action 404 indicates that the timer has not elapsed, the action 404 is repeated without further actions. No RF signal scanning or searching is performed if the timer has not yet elapsed.

If the timer has elapsed, signaling that a time interval of $T_n$ has expired, an action 406 is performed. The action 406 comprises searching 5G RF frequencies for a 5G RF signal and updating the displayed network symbol as needed. As an example, the action 406 may comprise performing the method 300 as described above with reference to FIG. 3. This results in either the LTE network symbol or the 5G network symbol being displayed by the device, depending on whether 5G is currently available.

After performing the searching and symbol updating, an action 408 is performed. The action 408 comprises determining whether the action 406 resulted in a change in the displayed network symbol, such as changing from LTE to 5G or from 5G to LTE. In response to determining that there has been a change of the displayed network symbol, an action 410 is performed of resetting the time interval length to a beginning value by setting n to 1. The method 400 is then repeated beginning at the action 402.

If the displayed network symbol has not changed, an action 412 is performed, comprising determining whether the length of the time period has reached its upper limit. In the illustrated embodiment, this may comprise determining whether n is equal to or greater than N (where $t_N$ is the maximum time interval). If n is less than N, an action 414 is performed of incrementing n by 1. The method 400 is then repeated beginning at the action 402, with the increased interval length. If n is equal to or greater than N, the increasing of n (i.e., the action 414) is stopped or omitted and instead the method 400 is repeated beginning at the action 402, without changing the interval length.

Figure 5:
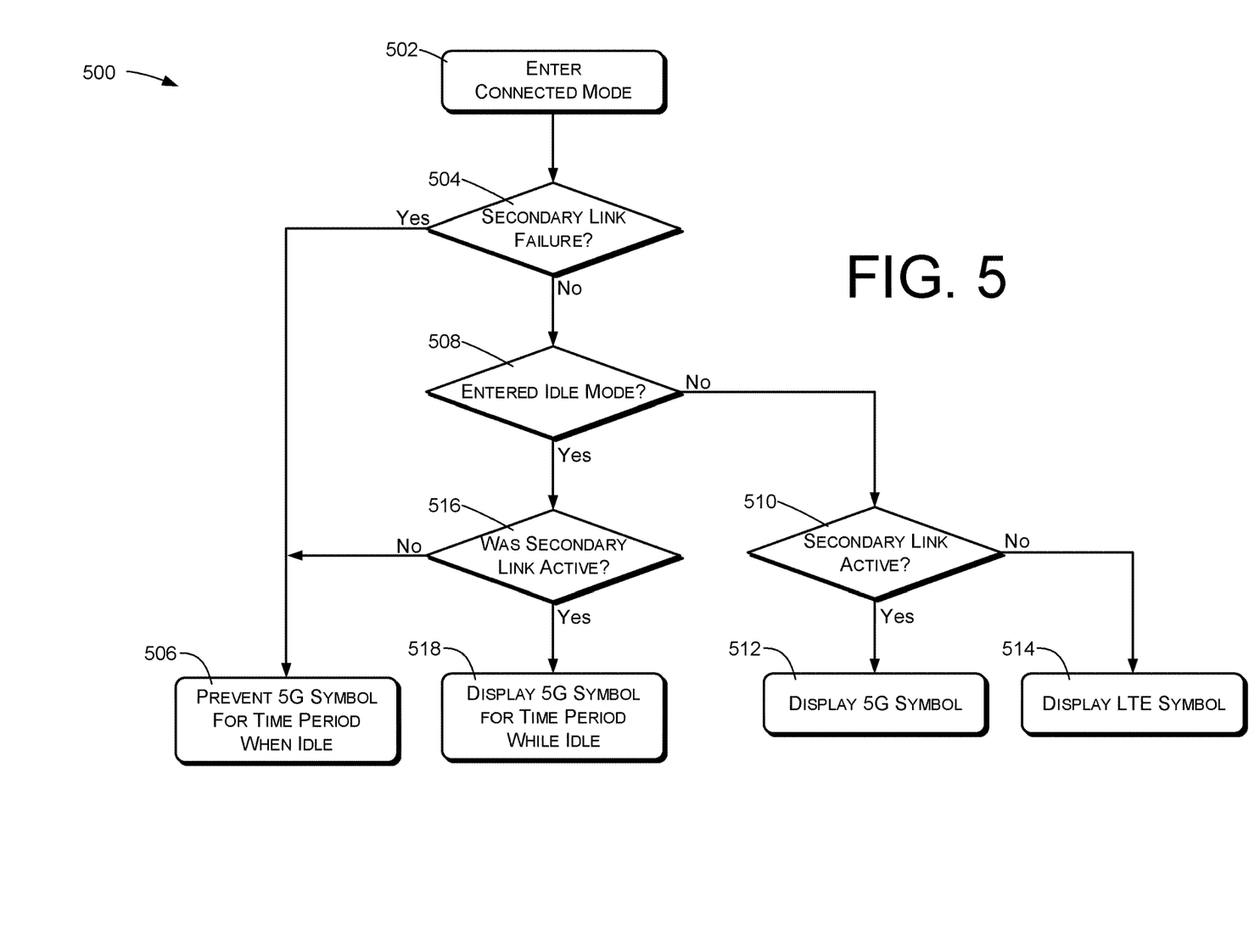
FIG. 5 is a flow diagram illustrating an example method for controlling the display of a network indicator in response to certain events.

FIG. 5 illustrates an example method 500 that may be used in some embodiments when determining which of multiple network symbols to display on a status bar of a communication device. The discussion of FIG. 5 assumes that a cellular communication device is using a cell that supports NSA dual connectivity. Accordingly, the cell has an LTE master base station and at least one 5G secondary base station. As discussed above, displaying an LTE network symbol indicates availability of the LTE radio access technology. Displaying a 5G network symbol indicates availability of the NR radio access technology.

An action 502 comprises establishing a data connection between the communication device and one or more base stations, thereby entering what is referred to as connected mode. More specifically, the action 502 may comprise establishing a primary communication link via the master base station, using LTE radio access technology. The action 502 may also comprise establishing, or attempting to establish, a secondary communication link via the secondary base station, using NR radio access technology. The actions subsequent to the action 502 are repeated while the communication device is in connected mode.

An action 504 comprises detecting a secondary link failure. For example, a secondary link failure may comprise a failure to establish the secondary communication link at any time while the device is in connected mode. As another example, a secondary link failure may comprise a failure of the secondary communication link after it has been established. In described embodiments, a communication link is implemented as a carrier between the device and a base station, and a failure of the link occurs when the carrier is lost or cannot be established.

If a secondary link failure is detected, an action 506 is performed of preventing the 5G network symbol from being displayed for at least a specified time period during any subsequent times that the communication device is in idle mode. The 5G network symbol is prevented from being displayed regardless of whether any idle-mode evaluations, such as the evaluations discussed above relating to FIGS.

2-4, have determined that 5G radio access technology is currently available. In other words, during the specified time period the action 506 overrides any other idle-mode determinations regarding whether 5G services are available. In the embodiments described herein, the action 506 may comprise instead displaying the LTE network symbol during the specified time period while the device is in idle mode.

In order to reduce power consumption of the device, the action 506 may also include pausing any RF signal scanning, such as the RF searching described with reference to FIGS. 2-4, that may otherwise be performed during the specified time period while in idle mode.

If a secondary link failure is not detected, an action 508 is performed. The action 508 comprises determining whether the communication device has entered idle mode from connected mode.

If a secondary link failure is not detected and the communication device has not entered idle mode (i.e., the device has remained in connected mode), an action 510 is performed of determining whether there is currently an active secondary link. If there is currently an active secondary link, an action 512 is performed of displaying the 5G network symbol. If there is not currently an active secondary link, an action 514 is performed of displaying the LTE network symbol.

If in the action 508 it is determined that the communication device has entered idle mode from connected mode, the communication device selects either the LTE network symbol or the 5G network symbol based at least in part on whether the secondary communication link was present at the time when the device entered idle mode. If the NR secondary communication link was present, the 5G network symbol is selected. If the NR secondary communication link was not present, the LTE network symbol is selected. The selected network symbol is then displayed for at least a specified time period while the device is in idle mode. Idle-mode RF signal scanning may also be paused during the specified time period.

More specifically, if the communication device has entered idle mode from connected mode, an action 516 is performed to determine whether the device entered idle mode at a time when the NR secondary communication link was present or when the NR secondary communication link was not present. If the 5G secondary communication link was present at the time the device entered idle mode, an action 518 is performed of selecting and displaying the 5G network symbol for at least a specified time period while the device is in idle mode, regardless of whether any idle-mode evaluations, such as the evaluations discussed above relating to FIGS. 2-4, have determined that 5G radio access technology is currently available. In other words, during the specified time period the action 518 overrides any other idle-mode determinations regarding whether 5G services are available.

If the 5G secondary communication link was not present at the time the device entered idle mode, the action 506 is performed of preventing the 5G network symbol from being displayed for at least the specified time period while the device is in idle mode, overriding any other idle-mode determinations as already discussed. The LTE network symbol may instead be displayed during this time period.

The actions of the method 500 starting at 504 may be performed repeatedly when the communication device is in connected mode to detect and respond to secondary link conditions and, if appropriate, to override selections of displayed network symbols that might otherwise be made.

Note that the actions 512 and 514 are performed when the device is in connected mode, and override the actions 506 and 518. That is, the actions 506 and 508 are applicable only when the communication device is in idle mode. Accordingly, each of the time periods of the actions 506 and 518 may comprise a fixed time or may instead extend only until the cellular communication device again enters connected mode and/or establishes an NR secondary communication link. In other embodiments, however, the actions 506 and 518 may be applicable even when the device is in connected mode, and may override the actions 512 and 514.

Figure 6:
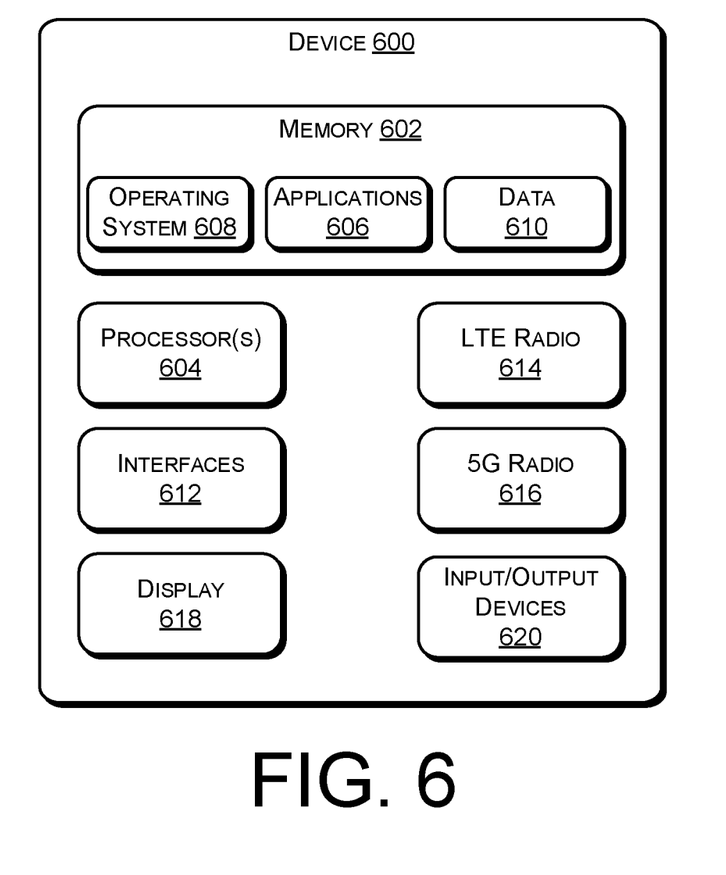
FIG. 6 is a block diagram of an example mobile communication device that may be configured in accordance with the described techniques.

FIG. 6 illustrates an example cellular communication device 600 that may be used to implement the techniques described herein. The methods of FIGS. 2-5, for example, may be implemented by a device such as the device 600. The device 600 is an example of the communication device 110, illustrating additional high-level components that are not shown in FIG. 1.

The device 600 may include memory 602 and a processor 604. The memory 602 may include both volatile memory and non-volatile memory. The memory 602 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 602 may include a SIM (subscriber identity module), which is a removable smart card used to identify a user of the device 600 to a service provider network.

The memory 602 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 602 may in some cases include storage media used to transfer or distribute instructions, applications, and/or data. In some cases, the memory 602 may include data storage that is accessed remotely, such as network-attached storage that the device 600 accesses over some type of data communication network.

The memory 602 stores one or more sets of computer-executable instructions (e.g., software) such as programs that embody operating logic for implementing and/or performing desired functionality of the device 600. The instructions may also reside at least partially within the processor 604 during execution thereof by the device 600. Generally, the instructions stored in the computer-readable storage media may include various applications 606 that are executed by the processor 604, an operating system (OS) 608 that is also executed by the processor 604, and data 610.

In some embodiments, the processor(s) 604 is a central processing unit (CPU), a graphics processing unit (GPU), both CPU and GPU, or other processing unit or component known in the art. Furthermore, the processor(s) 604 may include any number of processors and/or processing cores. The processor(s) 604 is configured to retrieve and execute instructions from the memory 602.

The device 600 may have interfaces 612, which may comprise any sort of interfaces known in the art. The interfaces 612 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 600 may also have an LTE radio 614 and a 5G radio 616, which may be used as described above for implementing dual connectivity in conjunction with an eNodeB and a gNodeB. The radios 614 and 616 transmit and receive radio frequency communications via an antenna (not shown).

The device 600 may have a display 618, which may comprise a liquid crystal display or any other type of display commonly used in telemobile devices or other portable devices. For example, the display 618 may be a touch-sensitive display screen, which may also act as an input device or keypad, such as for providing a soft-key keyboard, navigation buttons, or the like.

The device 600 may have input and output devices 620. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by a cellular communication device, comprising:
   receiving, from a first base station, an indication that the first base station is associated with a second base station to support dual connectivity, wherein the first base station operates using a first radio access technology and the second base station operates using a second radio access technology;
   in response to receiving the indication, repeatedly searching multiple frequencies to detect a radio frequency (RF) signal used by the second base station for communications with communication devices;
   in response to detecting the RF signal, displaying a symbol on the cellular communication device, wherein the symbol indicates that the second radio access technology is currently available to the cellular communication device;
   at a first time, detecting a first condition of the cellular communication device, wherein the first condition indicates that a probability that the cellular communication device is being viewed is less than a threshold probability level;
   in response to detecting the first condition, pausing the searching;
   at a second time, detecting a second condition of the cellular communication device, wherein the second condition indicates that the probability that the cellular communication device is being viewed is greater than a threshold probability level; and
   in response to detecting the second condition of the cellular communication device, resuming the searching.

2. The method of claim 1, wherein the cellular communication device has a graphical user interface and detecting the first condition comprises determining that the cellular communication device is not displaying the graphical user interface.

3. The method of claim 1, wherein:
   the searching is repeated at time intervals, each time interval having a length; and
   the method further comprises increasing the length after each repetition of the searching until the length reaches a limit.

4. The method of claim 1, wherein detecting the first condition comprises one or more of:
   determining that the cellular communication device is displaying a screen saver;
   determining that the cellular communication device has been locked for security;
   determining that the cellular communication device is in a low-power mode;
   determining that the cellular communication device is in a sleep mode;
   determining that the display of the cellular communication device is facing downward;
   determining that the cellular communication device is in a confined space;
   determining whether a camera of the cellular communication device is obscured;
   determining that the display of the cellular communication device is against a surface;
   determining that ambient sounds have been blocked;
   determining that a human face is not detected; or
   determining that the cellular communication device is stationary.

5. The method of claim 1, wherein receiving the indication comprises receiving a System Information Block (SIB) from the first base station.

6. The method of claim 1, wherein:
   the first radio access technology is a $4^{th}$-Generation (4G) radio access technology; and
   the second radio access technology is a $5^{th}$-Generation (5G) radio access technology.

7. The method of claim 1, wherein detecting the RF signal comprises determining that the RF signal has at least a threshold signal strength or at least a threshold signal quality.

8. A cellular communication device, comprising:
   a graphical display panel for display of a graphical user interface (GUI);
   one or more processors; and
   one or more non-transitory computer-readable media storing computer-executable instructions that, when executed by the one or more processors, cause the one or more processors to perform actions comprising:
   communicating with a master base station of a network cell, wherein the master base station operates using $4^{th}$-Generation (4G) radio access technology;
   receiving, from the master base station, an indication that the master base station is associated with a secondary base station to support a Non-Standalone Architecture (NSA), wherein the secondary base station operates using 5$^{th}$-Generation radio access technology;
at a first time, detecting a first condition of the cellular communication device, wherein the first condition indicates that a probability that the GUI is being viewed is greater than a threshold probability level;
in response to detecting the first condition, repeatedly searching multiple frequencies to detect an RF signal used by the secondary base station; and
in response to detecting the RF signal, displaying a symbol on the cellular communication device indicating that 5G services are currently available to the cellular communication device.

9. The cellular communication device of claim 8, wherein detecting the first condition comprises determining that the cellular communication device is displaying the GUI.

10. The cellular communication device of claim 8, wherein:
the searching is repeated at time intervals, each time interval having a length; and
the actions further comprise increasing the length after each repetition of the searching until the length reaches a limit.

11. The cellular communication device of claim 8, the actions further comprising:
at a second time, detecting a second condition of the cellular communication device, wherein the second condition indicates a probability that the GUI is being viewed is less than a threshold probability level; and
in response to detecting the second condition, pausing the searching.

12. The cellular communication device of claim 8, wherein detecting the first condition comprises one or more of:
determining that the cellular communication device is not displaying a screen saver;
determining that the cellular communication device is not locked for security;
determining that the cellular communication device is not in a low-power mode;
determining that the cellular communication device is not in a sleep mode;
determining that the display of the cellular communication device is not facing downward;
determining that the cellular communication device is not in a confined space;
determining that a camera of the cellular communication device is not obscured;
determining that the display of the cellular communication device is not against a surface;
determining that ambient sounds have not been blocked;
detecting a face; or
determining that the cellular communication device is moving.

13. The cellular communication device of claim 8, wherein detecting the RF signal comprises determining that the RF signal has at least a threshold signal strength or a threshold signal quality.

14. A method performed by a cellular communication device, the method comprising:
communicating with a master base station, wherein the master base station operates using 4$^{th}$-Generation (4G) radio access technology and is associated with a secondary base station to support a Non-Standalone Architecture (NSA), wherein the secondary base station operates using 5$^{th}$-Generation (5G) radio access technology;
repeatedly searching multiple frequencies to detect a radio frequency (RF) signal used by the secondary base station;
in response to detecting the RF signal, displaying a symbol on the cellular communication device indicating that the 5G radio access technology is currently available to the cellular communication device;
at a first time, detecting a first condition of the cellular communication device, wherein the first condition indicates that a probability that the GUI is being viewed is less than a threshold probability level; and
in response to detecting the first condition, pausing the searching.

15. The method of claim 14, wherein the cellular communication device has a graphical user interface and detecting the first condition comprises determining that the cellular communication device is not displaying the graphical user interface.

16. The method of claim 14, wherein:
the searching is repeated at time intervals, each time interval having a length; and
the method further comprises increasing the length after each repetition of the searching until the length reaches a limit.

17. The method of claim 14, further comprising:
at a second time, detecting a second condition of the cellular communication device, wherein the second condition indicates that a probability that the cellular communication device is being viewed is greater than a threshold probability level; and
in response to detecting the second condition, resuming the searching.

18. The method of claim 14, wherein detecting the first condition comprises one or more of:
determining that the cellular communication device is displaying a screen saver;
determining that the cellular communication device has been locked for security;
determining that the cellular communication device is in a low-power mode;
determining that the cellular communication device is in a sleep mode;
determining that the display of the cellular communication device is facing downward;
determining that the cellular communication device is in a confined space;
determining whether a camera of the cellular communication device is obscured;
determining that the display of the cellular communication device is against a surface;
determining that ambient sounds have been blocked;
determining that a human face is not detected; or
determining that the cellular communication device is stationary.

19. The method of claim 14, wherein detecting the RF signal comprises determining that the RF signal has at least a threshold signal strength or a threshold signal quality.

20. The method of claim 14, further comprising receiving a System Information Block (SIB) from the master base station indicating that the master base station supports a Non-Standalone Architecture (NSA).

* * * * *